United States Patent [19]
Jones et al.

[11] 4,059,786
[45] Nov. 22, 1977

[54] WHEELCHAIR CONTROL CIRCUIT

[75] Inventors: Michael Lloyd Jones, Tring; Peter Meredith Jobson, Aylesbury, both of England

[73] Assignee: Possum Controls Limited, Aylesbury, England

[21] Appl. No.: 578,023

[22] Filed: May 16, 1975

[30] Foreign Application Priority Data

May 23, 1974 United Kingdom ............... 23004/74

[51] Int. Cl.² ...................... B62D 11/04; H02P 7/00
[52] U.S. Cl. ....................................... 318/17; 180/6.5; 180/DIG. 3
[58] Field of Search .................. 318/5, 17, 34, 67, 103, 318/112, 139; 180/6.5, DIG. 3

[56] References Cited

U.S. PATENT DOCUMENTS

| | | | |
|---|---|---|---|
| 3,351,148 | 11/1967 | Solomon | 318/17 X |
| 3,874,468 | 4/1975 | Chatterjea | 180/6.5 X |

FOREIGN PATENT DOCUMENTS

| | | |
|---|---|---|
| 997,254 | 7/1965 | United Kingdom |
| 1,102,394 | 2/1968 | United Kingdom |
| 1,376,008 | 12/1974 | United Kingdom |

*Primary Examiner*—Robert J. Hickey
*Attorney, Agent, or Firm*—Robert F. O'Connell

[57] ABSTRACT

A wheel chair motor control circuit for a wheel chair having two independently controllable motor-driven wheels. The user has a "joystick" control operable from a datum position to move the wipers of two potentiometers both independently and simultaneously from their corresponding datum positions. A first, proportional control circuit is provided for each motor to supply it with drive power proportional to the magnitude of the deviation of its corresponding potentiometer wiper from datum and a second reversing circuit is provided for each motor to operate a reversing relay connected thereto in accordance to the direction of the deviation of its corresponding potentiometer wiper.

13 Claims, 2 Drawing Figures

WHEELCHAIR CONTROL CIRCUIT

The present invention relates to electrically-driven wheelchairs in which two, reversible, variable-speed, electric motors are coupled to two wheels of the chair respectively at the front or at the rear of the chair, the motors being energised from an electric battery carried by the chair. Hereinafter such chairs will be referred to as wheelchairs of the type specified.

The present invention is concerned with control circuits for use in controlling the two electric motors of a wheelchair of the type specified.

According to the present invention a control circuit suitable for use in controlling the two electric motors of a wheelchair of the type specified, comprises two control potentiometers of which the wipers are connected to a common control lever having a datum position and being operable from the datum position to manipulate the positions of the wipers of the potentiometers both independently and simultaneously from their corresponding datum positions, terminals through which voltages can be applied across the resistance-elements of the potentiometers whereby the output voltages at the wipers have magnitudes dependent upon the positioning of the control lever, a predetermined magnitude corresponding to the datum position and deviations on opposite sides of the predetermined magnitude constituting control signals for forward and reverse operation respectively of the two motors, each motor having a reversing relay connected thereto and the energising circuit of each reversing relay including a detector circuit individual to the relay and the corresponding control potentiometer, the detector circuit including means for detecting output voltage from its associated control potentiometer representative of a control signal for reverse operation of the motor to energise the associated reversing relay, and further means for driving each motor in dependence upon the deviation in the magnitude of the output voltage at the wiper of its associated control potentiometer from the datum.

The invention will now be described in detail by way of example with reference to the accompanying drawings in which.

In use a control circuit according to the present invention is mounted on a wheelchair which has two independently electrically driven wheels, one on each side, and two other wheels pivotally mounted to allow for steering. Steering is in fact achieved by controlling the power input to each of the driven wheels, the power source being batteries conveniently located beneath the seat of the wheelchair.

In both figures the control circuit for only one drive motor of the driven wheels is illustrated, it being understood that the control circuit for the other drive motor is exactly the same.

The input member for the control circuit is a manually operable lever hereinafter referred to as a joystick having associated with it two potentiometers one for each drive motor, the arrangement being such that movement of the joystick in one direction alters the setting on one potentiometer, movement in a second direction at right angles to the first alters the setting of the other, and movement in intermediate directions alters the setting of both simultaneously though obviously not necessarily to the same extent. The joystick, in this embodiment, is mounted on the arm rest of the wheelchair to be conveniently close to the operator's hand, and is biased to a central neutral position from which movement forward and back results in forward and reverse movement of the chair and movement to either side results in the chair turning in a corresponding direction by differential drive to the motors.

The preferred positioning of the joystick depends on the manner in which the user of the wheelchair is disabled. Thus, although an arm-rest mounted joystick is usually preferable, the joystick can be mounted for foot control or for chin control. It is important that joystick movement should be as unimpeded as possible since the user may be able to apply only very small forces to operate the joystick. Similarly, it is desirable for the control circuitry to be designed to smooth-out clumsy or jerky operation of the joystick and also for the number of user controls to be reduced to a minimum.

Figure 1:
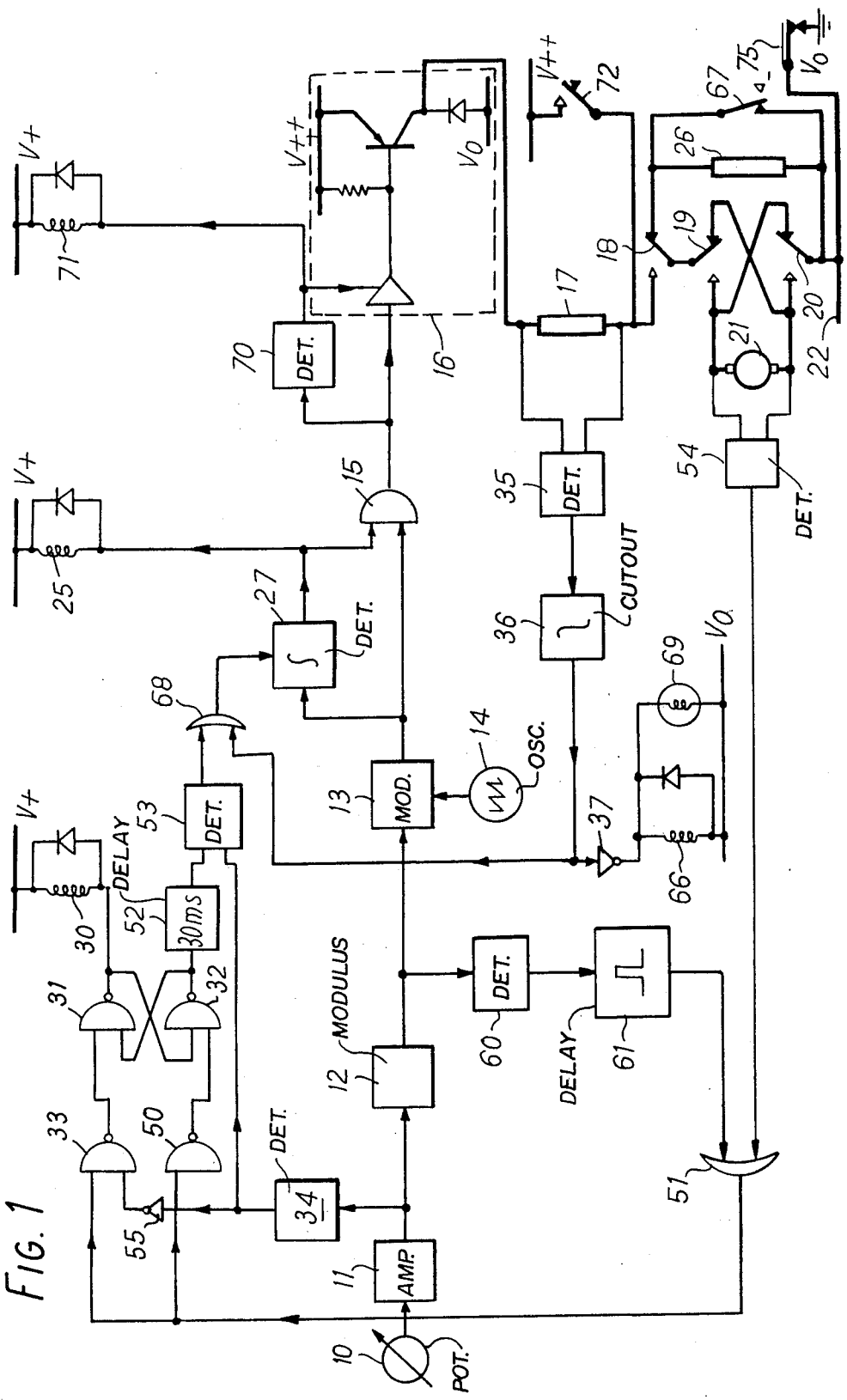
FIG. 1 is a block diagram of a first wheelchair control circuit.

Referring to FIG. 1, the combination of the joystick and one potentiometer is shown as a unit 10 providing an output signal to a scaling and offset amplifier 11. The gain of the amplifier affects the scaling of the system, i.e. affects the system response to a specified joystick movement, and the amplifier 11 is adjusted to amplify only the signal difference from the neutral position.

The amplifier output signal is passed to a circuit 12 and the modulus of the output signal is then compared with the output of a reference sawtooth oscillator 14 to control the width of the output pulses of a pulse width modulator 13, the pulse width increasing with increasing modulus signal. The frequency of the oscillator 14 is about 150 Hz.

Pulses from the modulator 13 are then passed to an AND gate 15, whose purpose will be explained hereinafter, and thence to a power amplifier 16 and through a resistor 17, contacts 18 of a power/brake relay, reversing contacts 19 and 20 of a reversing relay, and the motor armature 21 to earth on the line 22. It can be readily seen from the above that the system operates by pulse modulation of the D.C. (battery) supply to the motor.

A power/brake relay 25 is provided to control the operation of the contacts 18 from a first position, described above, in which power is connected to the motor, to a second position illustrated in FIG. 1 in which a braking resistor 26 is connected across the armature 21. The relay 25 maintains the contacts 18 in the "power" position unless the output from a detector 27, which is supplied from the modulator 13, indicates that there are no pulses being generated, in which case the contacts 18 change to the "brake" position.

The reversing contacts 19 and 20 are controlled by a reversing relay 30 which is energised from a bistable circuit, comprising interconnected NAND gates 31 and 32, NAND gates 33 and 50 and a polarity detector 34 from the output of the amplifier 11. While the purpose of the gates 31, 32 and 33 and 50 will become clearer hereinafter, the basic operation is simply to control the contacts 19 and 20 in accordance with the level of the output of the amplifier 11.

Built into the basic control circuit as described above are a number of safeguards to protect the circuit against damage or abuse.

One of such circuits protects the motor against overload caused, for example, by stall conditions and comprises a current detector 35 connected across the resistor 17.

Excessive current through the resistor is sensed, a cutout circuit 36 is activated for a specific period of time, e.g. 7 seconds, if this large current is present at a high mark/space ratio for more than a few seconds. When the cutout is activated, the detector 27 output is held low via its override input and OR gate 68. AND gate 15 ensures that no pulses reach the power amplifier 16 and the relay 25 is held in the brake position. The cutout, when activated, also de-energises a parking brake relay 66 via a drive circuit 37, applying a heavy brake to the motors and switching off a control indicator lamp 69.

A further necessary precaution is protection against sudden changes from forward to reverse or vice versa, and it is also desirable to ensure that the reversing contacts change on no-load. These functions are performed by the gates 31 to 33 and 50 previously mentioned in conjunction with OR gate 51, a delay circuit 52 and a coincidence detector circuit 53.

Taking firstly the no-load change function, a detector 54 is provided to sense the armature voltage of the motor and to supply a signal to one input of the OR gate 51. The output of OR gate 51 is supplied in parallel to inputs of the gates 33 and 50 the outputs of which are connected to inputs of bistable circuit comprising the interconnected gates 31 and 32. As previously indicated one output of the bistable goes to the relay 30, but the other goes to the delay circuit 52, which on receiving an input provides an inverted output after a delay of 30 ms. and thence to the coincidence detector 53. The output of the detector 53 is taken as an overriding inhibit input to the detector 27. It should also be noted that the signal from the reversal detector 34, besides being applied to the gate 50, is applied to a second input of the detector 53 and also, through an inverter 55 to a second input of the gate 33.

Assume that the joystick is now moved from a "forward" position to a reverse position, changing the input to the gates 33 and 50, causing the bistable to change over and causing change of the relay 30. Before the relay 30 has time to operate, however, power drive is removed by the changed output of coincidence detector 53 acting through the OR gate 68, the override input of detector 27, and AND gate 15. The coincidence detector 53 remains changed for the period of the delay of delay circuit 52. During this time, the reversing relay contacts 19 and 20 and contacts 18 change to apply the brake. The effect of these changes is that power is removed from the motor while contacts 19 and 20 are operated, and the brake is applied via the contacts 18 of the relay 25.

To further protect against large joystick movements, e.g. full ahead to full reverse, a detector 60 is provided to receive the modulus output of the circuit 12 and in the event of a decreasing output crossing a preset threshold (corresponding to the joystick moving towards the centre at about 20% deflection) triggers a retriggerable delay circuit 61 to provide an output pulse of about 0.8 secs. duration to a second input of the gate 51. The presence of this signal in a reversal situation inhibits change of the bistable and thus prevents reversal of the contacts 18 and 19 while not interfering with the braking and power removal aspects of the situation. Of course, if the detector 54 should sense a zero voltage, indicating non-rotation of the armature 21, while the signal from the circuit 61 is present, the operation of the NAND gate 51 permits reverse energisation without further delay.

To allow for parking of the wheelchair a parking relay 66 is provided, which is normally energised when the control is switched on. When the control is switched off, the relay de-energises and contacts 67 operate to short out the brake resistor 26 and so apply a heavy brake to the motor 21.

A lamp 69, across the parking relay coil 66, then indicates, when not illuminated, that the control is switched off or the cutout is operating.

To increase power and reduce power consumption at full-speed detector 70 is added which controls relay 71 with contacts 72. Detector 70 gives an output to energise relay 71 about 1 second after full drive (i.e. no pulses, high D.C. level), to the amplifier 16. When the relay 71 is energised, contacts 72 close to switch the battery supply directly to the power contacts 18. At the same time a signal from the full-drive relay coil is used to switch off the power drive amplifier 16 to reduce power dissipation. As soon as a pulsed waveform on the input of the amplifier 16 is detected, the amplifier 16 is switched on and the relay 71 is de-energised, breaking contacts 72. Proportional control is immediately available again.

Figure 2:
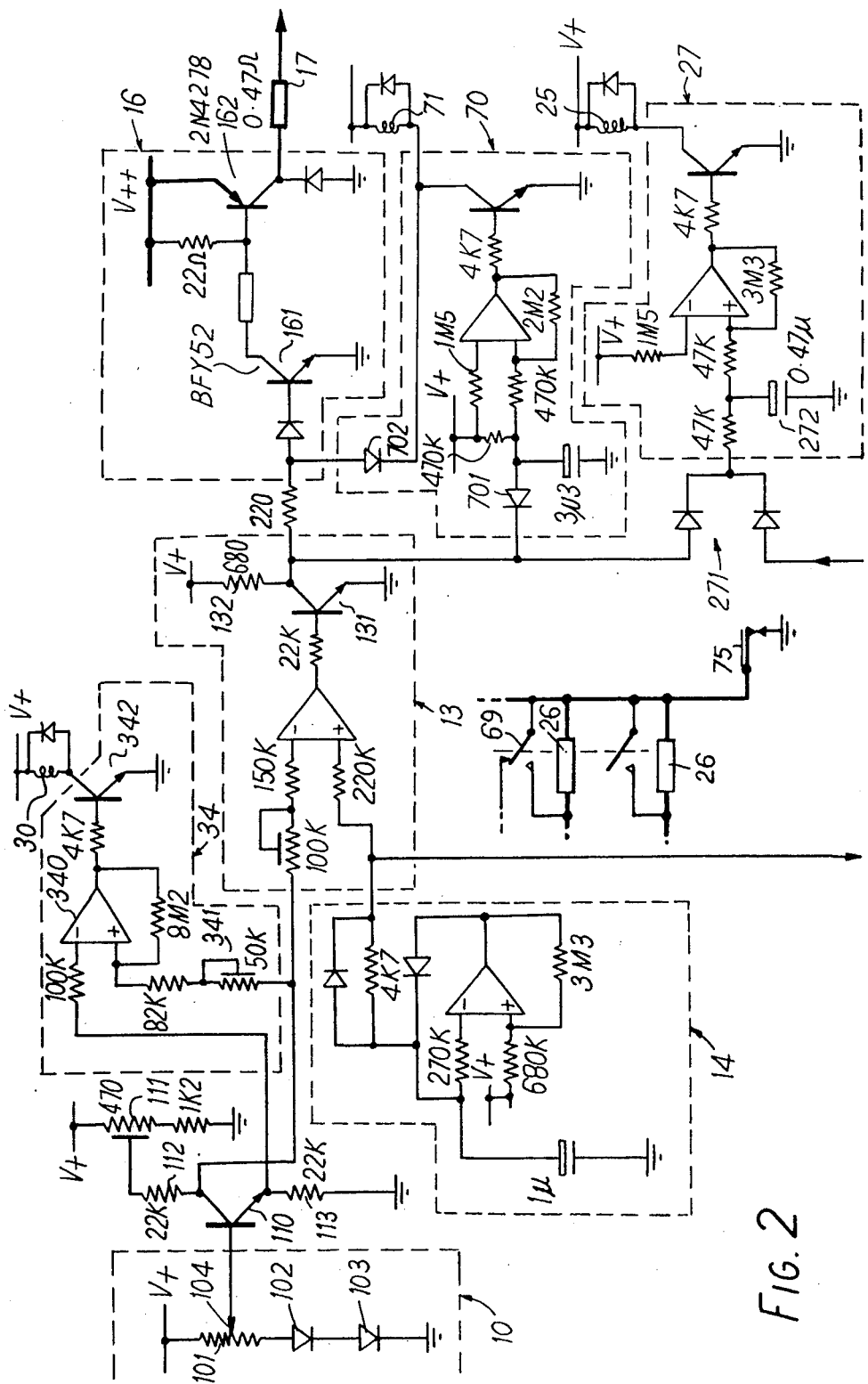
FIG. 2 is a circuit diagram of a second simplified wheelchair control circuit.

The circuit described above has operational refinements which are not essential for a user who retains a sufficient degree of manipulative skill. Thus a more basic control circuit may be all that is required and such a circuit is shown in FIG. 2. Again, only half of complete circuit is shown since the other half, for the other wheel is substantially identical. The same saw-tooth generator 14 is shared by both circuits and the same circuit is used to operate the power brake relay 25 which operates contacts on both motors. Apart from that the only shared features are the power-supply and a hand-brake control switch 80 which is a separate user-operated switch and not part of the rest of the control circuit.

All the transistors in the circuit described below are of type BC 182 unless otherwise specified and the operational amplifiers are of type LM 3900.

The joystick unit 10 comprises a potentiometer 111 connected in series between a positive supply voltage and two diodes 102, 103 to earth. The slider 104 of the potentiometer 101 is thus free to move over a range of potentials to within two diode drops of earth.

The potential of the wiper 104 is connected directly to the base of a transistor 110 which is connected in a circuit to perform the functions of both the scaling and offset amplifier 11 and the circuit 12 for taking the modulus. The transistor 110 has a first 22K ohm resistor connecting its emitter to earth and a second 22K ohm resistor connecting its collector, via a preset potentiometer 111 to the positive supply potential. The joystick wiper 104 provides the base bias for the transistor 110 in this configuration which therefore operates in two modes: a "forward" mode in which its base potential is so high that current flow through the transistor 110 saturates so that its collector potential is substantially the same as the potential of the wiper 104; and a "reverse" mode in which the transistor 110 is biassed as an ordinary common emitter amplifier in which the collector potential moves in the opposite direction to the base potential.

In the "forward" mode the voltage drop between the collector and emitter of the saturated transistor 110 is constant at about 0.2v while in the reverse mode this voltage drop is larger than 0.2v. This voltage drop is used by the direction detector circuit 34 which is further described below.

The potentiometer 111 is used to set the zero-point of the wiper 104. At that point the collector of the transistor 110 reaches its lowest value of potential. The gain of the transistor amplifier in the forward mode is effectively unity while its gain in the reverse direction is determined by the ratio of the resistors in its collector and emitter leads. This is arranged to be unity also but should a different response for forward and reverse behavior be wanted the reverse gain may be altered by altering the resistance values of the resistors.

The direction detector circuit 34 comprises an operational amplifier 340 connected with positive feed-back, so that it has essentially only two states; "on" and "off". Its negative input is connected to the emitter of the transistor 110 via a fixed 100K ohm resistor while its positive input is connected to the collector of the transistor 110 via a presettable resistance chain including a potentiometer 341. The potentiometer 341 is adjusted so that the amplifier 340 turns "on" when its positive input is at a potential of 0.4 volts more than its negative input. The "on" state indicates the reverse condition and is used to turn on a transistor 342 which energises the coil of the reversing relay 30.

The sawtooth oscillator 14 and the pulse width modulator 13 are of conventional design as can be seen from the figure. The output stage of the pulse width modulator 13 is an inverter and comprises a transistor 131 connected between the full driving battery voltage and earth using a 680 ohm, 1 watt collector resistor 132. The output from the collector of the transistor 131 is connected via an OR-gate 271 to the no-pulse detector 27 and via a diode 701 to the full-speed detector.

The no-pulse detector 27 has the other input of its OR-gate 271 connected to the corresponding point of the other control circuit. The OR-gate feeds a low-pass filter arrangement. So long as there are pulses to drive the motor a capacitor 272 of the filter circuit remains charged and via an operational amplifier and an output transistor the power-brake operating relay 25 is kept turned on without chatter. This keeps the braking resistor 26 disconnected. When the power pulses cease for sufficient time the relay 25 releases and a braking resistor 26 (of about 2.2 ohms resistance) is connected across each of the motors 21. The operational difference here is that a separate power braking facility is not provided for each wheel. The brakes are not applied for turning (one wheel on the other off) but only for stopping.

The full-speed detector 70 also has an integrator circuit arrangement but this one is wired to respond after there have been continuous pulses for a second or so. An extra feature is a diode connection 702 to the input of the power amplifier 16 which cuts it off when the full-power relay 71 is energised.

The power amplifier 16 comprises an input transistor 161 of type BFY 52 driving PNP power output transistor 162 of type 2N4278. The collector of the output transistor 162 is connected to the motor in the same manner as shown in FIG. 1 via the resistor 17 which has a resistance of 0.47 ohms.

The hand-brake relay 66 is replaced by a user-controlled switch 69 which shorts the brake-resistors 26 and also disconnects the earth side of the power supply from the control circuit.

Both embodiments are equipped with thermal cut-outs 75 in the motor supply leads. Thus if the motors are stalled or nearly stalled and draw too large a current an automatically resettable thermal cut-out 75 will turn the current off. The cut-out 75 will spring back after a few seconds which should give the user ample time to respond to the problem which has caused it to operate.

We claim:

1. A control circuit suitable for use in controlling the two electric motors of a wheelchair of the type specified, comprises two control potentiometers with respective wipers which are connected to a common control lever, said control lever having a datum position and being operable from the datum position to manipulate the positions of the wipers of the potentiometers both independently and simultaneously from their corresponding datum positions, terminals through which voltages can be applied across the resistance-elements of the potentiometers whereby the output voltages at the wipers have magnitudes dependent upon the positioning of the control lever, a predetermined magnitude corresponding to the datum position and deviations on opposite sides of the predetermined magnitude constituting control signals for forward and reverse operation respectively of the two motors, each motor having a reversing relay connected thereto and the energising circuit of each reversing relay including a detector circuit individual to the relay and the corresponding control potentiometer, the detector circuit including means for detecting output voltage from its associated control potentiometer representative of a control signal for reverse operation of the motor to energise the associated reversing relay, and further means for driving each motor in dependence upon the deviation in the magnitude of the output voltage at the wiper of its associated control potentiometer from the datum.

2. A control circuit according to claim 1 including a full-speed relay with contacts arranged to by-pass the means for driving at least one of the motors in dependence on the said deviation of at least one of the wipers and an energising circuit arranged to operate the full-speed relay after the said deviation has reached a threshold magnitude.

3. A control circuit according to claim 2 wherein the energising circuit of at least one of the full-speed relays is energised with a delay of a predetermined duration after the said threshold magnitude is reached.

4. A control circuit according to claim 2 wherein the energising circuit of at least one of the full-speed relays is arranged to prevent at least one of the means for driving the motors from dissipating large quantities of power when by-passed.

5. A control circuit according to claim 1 including a brake relay with contacts arranged to apply a brake to at least one of the motors and a brake-relay energising circuit arranged to apply at least one of the brakes when at least one of the potentiometers is at least near to datum.

6. A control circuit according to claim 5 wherein the brake relay has contacts arranged to connect a braking resistor across at least one of the motors.

7. A control circuit according to claim 1 including hand-brake contacts which may be switched to connect a short circuit across the motors to prevent the wheels of the wheelchair from turning.

8. A control circuit according to claim 7 wherein the hand-brake contacts are the contacts of a hand-brake relay with an operating circuit responsive to the current flowing through the motors and arranged to apply the hand-brake short circuit to protect the motors when an excessive current is flowing therethrough.

9. A control circuit according to claim 1 including a thermal cut-out in the motor drive circuits to cut the flow of current when it becomes excessive.

10. A control circuit according to claim 1 wherein the operating circuit of each of the reversing relays includes means responsive to the speed of its motor to delay a change of state of the reversing relay until the motor has at least nearly stopped.

11. A control circuit according to claim 1 wherein the detector circuit of each reversing relay includes a transistor connected as a common emitter amplifier with its base connected to the wiper of its corresponding potentiometer, the biasing arrangement being such that for control in one direction the transistor acts as a common emitter amplifier with its collector potential varying inversely with variation in its base potential and a varying potential drop between its collector and its emitter, and for control in the other direction the transistor is saturated with its electrodes all being at substantially the same potential; and a differential amplifier having its inputs connected across the collector and the emitter of the said transistor to provide one output state when the potential between its inputs is small and another output state when the potential between its inputs exceeds a threshold value, the differential amplifier being connected to control the state of the reversing relay in accordance with the output states of the differential amplifier.

12. A control circuit according to claim 11 wherein the threshold potential is not greater than 0.5v.

13. A control circuit according to claim 11 wherein the collector potential of the said transistor is used as a signal indicative of the magnitude of the deviation of the wiper from datum.

* * * * *